Jan. 3, 1961    J. W. MILLER ET AL    2,967,032
CONTROL APPARATUS

Filed March 20, 1957    2 Sheets-Sheet 1

INVENTOR.
JOHN W. MILLER
GEORGE D. SWANLUND
BY
Roger W. Jensen
ATTORNEY

Jan. 3, 1961 J. W. MILLER ET AL 2,967,032
CONTROL APPARATUS
Filed March 20, 1957 2 Sheets-Sheet 2

INVENTOR.
JOHN W. MILLER
GEORGE D. SWANLUND
BY
Roger W. Jensen
ATTORNEY

United States Patent Office 2,967,032
Patented Jan. 3, 1961

2,967,032
CONTROL APPARATUS

John W. Miller, West St. Paul, and George D. Swanlund, Brooklyn Center, Minn., assignors to Minneapolis-Honeywell Regulator Company, Minneapolis, Minn., a corporation of Delaware Filed Mar. 20, 1957, Ser. No. 647,295

8 Claims. (Cl. 244—77)

This invention relates to the field of dirigible craft controls and more particularly to coordinate conversion apparatus.

Aircraft have been provided with automatic pilots for maintaining the aircraft at certain attitudes and along certain ground tracks heretofore, but generally in each particular device there is required a certain amount of coordinate transformation from one particular system to another and filtering is generally required to give the aircraft a smooth performance or response. In automatic systems such as fire control systems, instrument landing systems and ground controlled approach systems, signals which are received by a radar receiver or computer generally are received in aircraft coordinates or are transformed into aircraft coordinates, or coordinates relative to the three principal axes of the aircraft such as roll, pitch, and yaw where they are filtered and then used to control the aircraft in these coordinates or transformed to coordinates relative to the earth or to a stable reference which is properly aligned with the earth's vertical.

A standard technique used with earth axes control systems is to filter the coordinates of a vector in earth coordinates. By performing the filtering in earth coordinates, a fixed reference system is provided in which no errors are introduced by the filter lags.

To be more specific "earth axis filtering" consists of filtering the computer output voltages after they have been transformed from aircraft coordinates to earth stabilized coordinates through an attitude angle resolver. That is, the resolver outputs represent the vertical and horizontal components of the error vector instead of the elevation and azimuth components. After filtering, the error signals may be transformed back to aircraft coordinates for presentation to the monitoring equipment or to an autopilot.

For instance, the computer outputs, determined by the angular velocity components of the error vector follow the geometric error components during roll with no lag except the tracking lag of the radar or receiving device. If these computer rate outputs were transmitted directly to the autopilot pitch-rate and yaw-rate channels with the same gain, the airplane would, ideally, make a level turn in response to this error. Because of the filter requirements in the coupler, however, the computer outputs are not transmitted directly to the autopilot. As stated above, as the aircraft rolls, the output of the coupler will lag by an amount depending on the filter time constant and the roll rate. In other words, the effect of improper filtering is that the vector components are being rotated when they should remain fixed. This rotation is caused by the apparent lag of the signal leaving the filter and results in a delayed signal being transmitted to the autopilot. Therefore, some means of compensation is required when filtering is used in a coupler with signals which are components of coordinates relative to the air frame in order to have steering signals that are independent of aircraft roll rate.

Another technique is commonly referred to as "cross roll correction." In a system which is made up of a computer, a coupler, and an autopilot, the signals are generally received in coordinates relative to the earth, the aircraft, or a stable platform. The coordinates may represent the angular velocity or rotational displacement components of a vector from the aircraft's position to an object or vice versa. These coordinates of the vector, which are received as signals representative of the vector in earth coordinates are then resolved about a particular axis of the aircraft to provide signals which are representative of the vector in a coordinate system relative to the air frame. It is then at this point that the noise accompanying these signals is generally filtered and after being filtered is corrected by a method commonly called "cross roll correction." The terms "cross roll correction" are usually identified with the process of smoothing or filtering the computer output signals for automatic control of an aircraft or for manual operation while monitoring radar equipment. The "cross roll correction" method filters the error signals in aircraft coordinates but interconnects two channels such as the elevation and azimuth channel so that the output of either channel is fed to the opposite channel with a gain proportional to aircraft roll attitude rate and filter time constant assuming the error signals represented an angular velocity. The magnitude of the cross roll correction signal is then made just sufficient to eliminate the effects of the dynamic lag of the filter. However, the disadvantages of using "cross roll correction" are that this type of correction is critical because a large and changing value of error normally exists at the filter and the method becomes complex for filters of order greater than one.

For certain computer apparatus it is desirable to filter the components of the error vector in aircraft coordinates ahead of the resolver in order to eliminate various modulating and demodulating devices. Normally this method cannot be used because it introduces cross roll errors. The present invention eliminates the cross roll errors by producing a lag in the resolver mechanism which corresponds to the same lag produced in the filter networks while filtering the components of the error vector.

It is a general object therefore of this invention to provide a computer which will transform signals representative of a vector relative to a first reference into coordinates related to a second reference and filter the signals without producing an apparent rotating lag in the output signals.

A further object of the present invention is to use the inherent imperfections of the mechanism which drives the resolver to produce output signals from the resolver which are in apparent synchronization with the signal produced by the sensing means.

Another object of the present invention is to minimize the demodulator and modulator apparatus used in conjunction with the resolving mechanism of a coupler apparatus placed between a computer and an autopilot.

These and other features of the invention will be understood more clearly and fully from the following detailed description and accompanying drawings in which.

Figure 5:
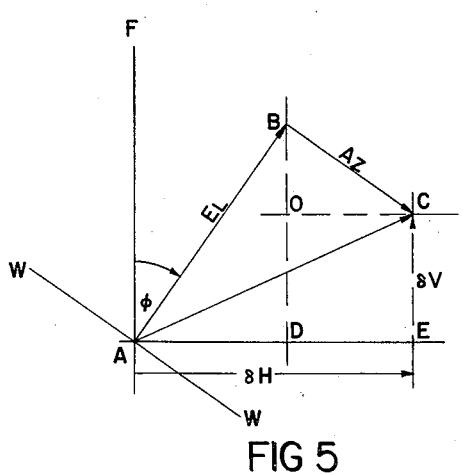
Figure 5 is a vector diagram showing the result of transforming components relative to a first reference into components relative to a second reference.

In Figure 5, a line WW represents the pitch axis of an aircraft. A point A represents the longitudinal axis or roll axis of the aircraft which is perpendicular to the pitch axis WW, and intersects pitch axis WW. A line AC represents a vector from the aircraft to an object which determines a pair of components AB and BC which are all in the plane of the paper. Vector AB represents the elevation component of vector AC for a given roll angle $\phi$ and vector BC represents the azimuth component of vector AC for a given roll.

The roll angle $\phi$ is described as the angle between a true vertical represented by a line AF and the vector AB which is also the same angle as formed by the pitch axis WW and a line AE which lies in a true horizontal plane. When the components of vector AC are transformed about the roll axis A through angle $\phi$, a vector AE is developed by adding the horizontal component AD of vector AB and the horizontal component DE of vector BC. In like manner, a vector EC is developed by adding the vertical component BO of vector BC to the vertical component BD of vector AB. A receiver and computer or radar device is used to produce electrical signals represented by the components. When the vectors as just described are replaced by electrical signals then:

$$\delta V = E_L \cos \phi - A_Z \sin \phi$$
$$\delta H = E_L \sin \phi + A_Z \cos \phi$$

When:

$E_L$ = The electrical signal representative of elevation component AB of vector AC.
$A_Z$ = The electrical signal representative of azimuth component BC of vector AC.
$\delta V$ = An electrical signal representative of a vertical component EC of vector AC with respect to the earth.
$\delta H$ = An electrical signal representative of a horizontal component AE of vector AC with respect to the earth.
$\phi$ = The angle through which the aircraft has rolled.

It is thus apparent that whenever the aircraft rotates about the roll axis A, the horizontal and vertical signals which are utilized in an autopilot will be varied in accordance with the above described trigometric relations.

Figure 1:
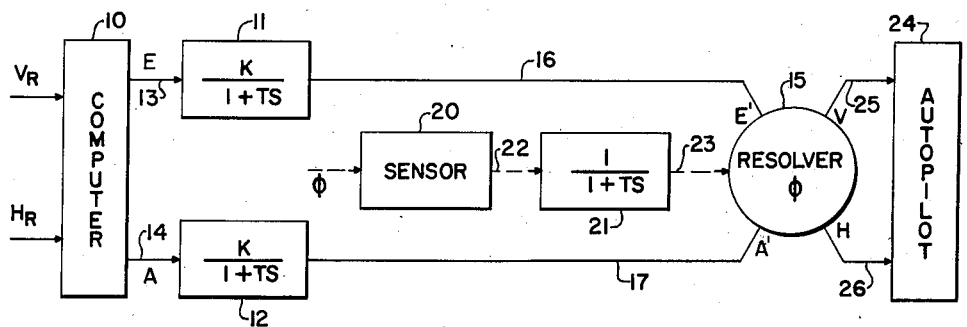
Figure 1 is a block diagram of the control apparatus.

Figure 1 shows a computer 10 which includes a radar receiver for receiving a pair of radar signals $V_R$ and $H_R$ representative of the respective vertical and horizontal components of the vector from the aircraft carrying computer 10 to some object. The computer 10 transforms the radar signals $V_R$ and $H_R$ which are received in an earth axes control system into signals represented by E and A respectively of an aircraft axes control system.

The E and A signals energize a pair of filter networks 11 and 12 through two connecting leads 13 and 14. After the signals have been filtered they are used to energize a resolver 15 through a pair of connecting leads 16 and 17. A sensor 20 is employed to sense the rotation of the aircraft about its roll axis and would generally be a vertical gyroscope although other means could be used for sensing said rotation. Sensor 20 is connected to a servo system 21 through a connecting means 22. Servo system 21 which includes a filter network and a motor-generator combination connected to resolver 15 by a connecting means 23. Filter networks 11 and 12 may be of any complexity as long as servo system 21 has the same transfer function as filter networks 11 and 12. Resolver 15 has a pair of input signals E' and A' which are transformed about a roll angle $\phi$ to produce a pair of output signals V and H. V and H represent the vertical and horizontal signals needed to control an autopilot 24 which is connected to resolver 15 by a pair of connecting leads 25 and 26.

Figure 2:
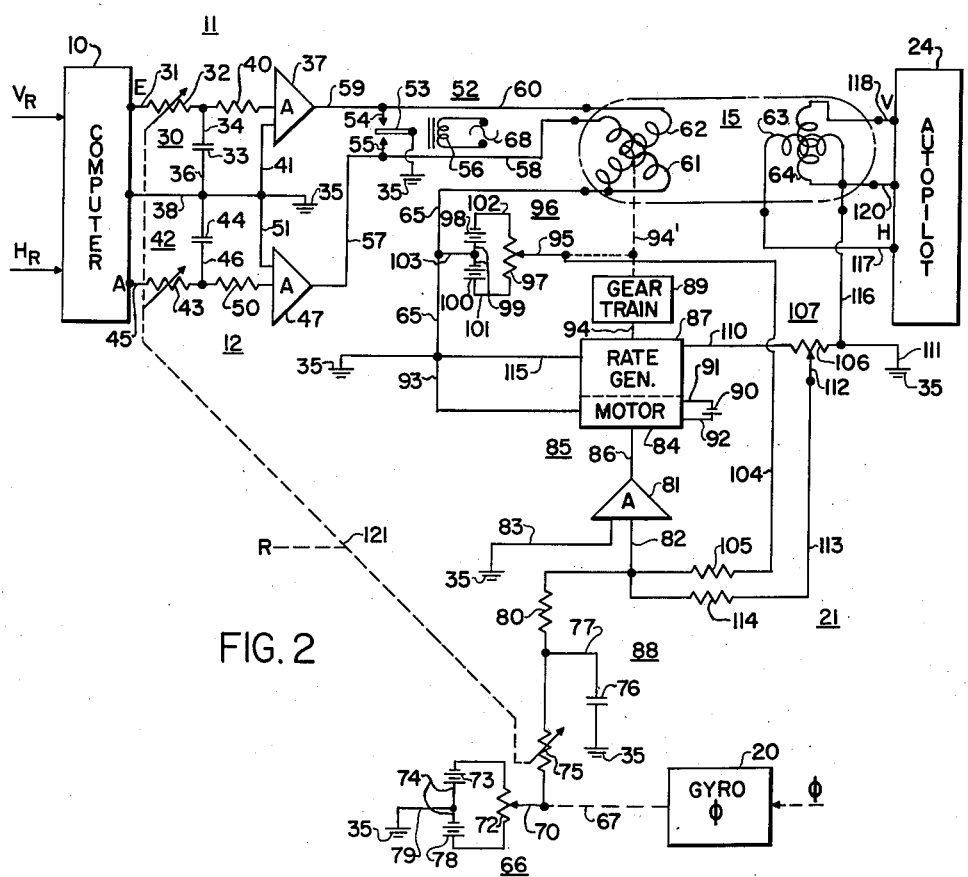
Figure 2 is a schematic diagram of the resolving apparatus as used in the coupler.

Figure 2 shows a computer 10 adapted to receive a vertical signal $V_R$ which would be representative of the vertical component of the radar signal and $H_R$ which would be representative of the horizontal component of the error signal. Computer 10 may be of the type shown and described in "Aviation Week," page 7, October 31, 1955. While the two aforementioned signals are in the computer 10 they are transformed from earth coordinates into aircraft coordinates in a manner such as that described for Figure 5 by a resolving device. This device may be of the type described by H. M. James in Patent 2,715,274. Elevation signal E is received from computer 10 and is used to energize a variable resistor 32 of a filter network 30 through a connecting lead 31. Filter 30 is made up of variable resistor 32 and a capacitor 33. Variable resistor 32 is connected to one terminal of capacitor 33 by a connecting lead 34. Capacitor 33 has the terminal opposite the terminal which is connected to lead 34 connected to a ground 35 by a connecting lead 36. A D.C. amplifier 37 is connected to filter 30 by a resistor 40 which is connected to a junction point of connecting lead 34 and variable resistance 32. Amplifier 37 is further connected to ground point 35 by a connecting lead 41. Computer 10 is also connected to ground 35 by a connecting lead 38.

Another computer output signal A, representative of the azimuth component of the error vector is used to energize a second filter network 42. Computer 10 is connected to a variable resistor 43 of filter network 42 by a connecting lead 45. The other terminal of variable resistor 43 is connected to a capacitor 44 of filter network 42 by a connecting lead 46 and a direct current amplifier 47 by a coupling resistor 50. Amplifier 47 is further connected to ground 35 by a connecting lead 51. A modulating device 52 of the type more commonly known as a chopper comprises an armature 53, a pair of contacts 54 and 55, and a solenoid coil 56 which is excited by an alternating voltage source 68. Alternating voltage source 56 is of the same frequency as the operating frequency of resolving means 15 and causes armature 53 to vibrate and alternately engage contacts 54 and 55. Armature 53 has one end connected to ground 35. The output of amplifier 37 is a direct-current signal as is the output of amplifier 47 and the respective outputs are connected to contacts 54 and 55 of modulating device 52. Synchro type resolver 15 is connected to contacts 54 and 55 respectively through two connecting leads 60 and 58. Resolver 15 has a pair of rotor windings 61 and 62 which are electrically displaced by 90° and a pair of stator windings 63 and 64 which are similarly displaced electrically by 90°. Connecting lead 60 is attached to one end of rotor coil 62 and connecting lead 58 is attached to one end of rotor coil 61. The opposite ends of rotor coils 61 and 62 are connected to ground 35 through a connecting lead 65.

The sensor of Figure 1 is replaced by a stable reference device or gyroscope 20 and is located in the aircraft so as to detect roll of the aircraft or any rotations about its longitudinal axis. Gyroscope 20 may be of any type which is a common usage employing means for producing an output signal representative of the displacement about the particular axis for which a measurement is desired. Gyroscope 20 is mechanically connected to a potentiometer 66 by a shaft 67 which rotates a movable contact arm 70 of potentiometer 66. Potentiometer 66 also includes a resistive element 72 which is connected in parallel with a direct current voltage source such as a pair of batteries 73 and 78 which are placed in series and connected to a common ground 35 by a pair of connecting leads 74 and 79. A signal is therefore presented on movable contact arm 70 which is representative of the aircraft roll and this signal is used to energize a variable resistor 75 of filter network 88. A filter network 88 is made up of a capacitor 76 which has one terminal connected to variable resistor 75 by connection lead 77 opposite the terminal connection to movable contact arm 70. The other terminal of capacitor 76 is connected to ground 35. A summing resistor 80 is connected to a junction point of connecting lead 77 and variable resistor 75 and has the end opposite this connection connected to an amplifier 81 by a connecting lead 82. Amplifier 81 is also connected to ground 35 by a connecting lead 83. A signal from amplifier 81 is then used to energize a motor 84 of a motor-generator combination 85 through a connecting lead 86. Motor-generator combination 85 also includes a rate generator 87. Motor-generator 85 and amplifier 81 may be of any common type employing D.C. inputs and outputs. Thus, a signal which appears on connection lead 86 will be a direct current signal which is of a positive or negative sense with respect to ground 35, and as the roll angle $\phi$ varies, movable contact arm 70 will be varied clockwise or counter-clockwise by gyroscope 20 to cause the magnitude of the signal which is present on connecting lead 86 to drive motor 84. Motor 84 has its excitation field excited by a voltage source 90 which is connected to motor 84 by a pair of connecting leads 91 and 92. Motor 84 is further connected to ground 35 by a connecting lead 93. As motor-generator combination 85 rotates, it turns a shaft 94, a reduction gear train 89, and a shaft 94' which is used to rotate the rotor windings 61 and 62 of synchro resolver 15. Gear train 89 is optional, since for some applications it may not be required. Shaft 94' also positions a movable contact arm 95 of a potentiometer 96. Potentiometer 96 further includes a resistive winding 97 which is connected to a voltage source such as a pair of batteries 98 and 100 connected in series by a common lead 99. Batteries 98 and 100 have their terminals opposite the ones joined by the common lead 99 connected to resistive winding 97 by a pair of connecting leads 101 and 102. Common lead 99 is also connected to ground 35 by connecting lead 103. As shaft 94' rotates, a signal will be developed on movable contact arm 95 which is opposite in sense and equal in magnitude to the signal which was received at amplifier 81 by connecting lead 82, and this signal is combined at amplifier 81 through a connecting lead 104 and summing resistor 105, one terminal of resistor 105 being connected to connecting lead 104 and the opposite terminal being connected to connecting lead 82. Thus a balance signal is provided to nullify the input signal from the gyroscope and cause motor-generator combination 85 to stop rotating. A rate signal is developed by rate generator 87 and is applied to one end of the resistive portion 106 of a potentiometer 107 through a connecting lead 110. The other end of resistive portion 106 of potentiometer 107 is connected to ground 35 through a connecting lead 111. Potentiometer 107 has a movable contact arm 112 which makes contact with resistive portion 106 and is connected to amplifier 81 through a connecting lead 113 and a summing resistor 114 which terminates at connecting lead 82, connecting the parallel summing resistors 80, 105, and 114 to amplifier 81. To complete the rate feedback signal, rate generator 87 is also connected to ground 35 through a connecting lead 115.

The signals presented to rotor windings 61 and 62 are resolved about the roll angle $\phi$ and transformed into coordinates relative to the earth in stator windings 63 and 64, to energize autopilot 24. One end of stator winding 63 is connected to ground 35 through a connecting lead 116 which provides a signal ground reference and the other end of stator winding 63 is connected to autopilot 24 by a connecting lead 116 and the opposite end of stator winding 64 is connected to autopilot 24 through a connecting lead 118. Autopilot 24 is also connected to ground 35 by a connecting lead 120.

Variable resistors 32, 43, and 75 have a movable contact arm, all of which are connected to each other or ganged, and driven by a common shaft 121 which may be representative of range of the aircraft from the given object.

*Operation*

Figure 3:
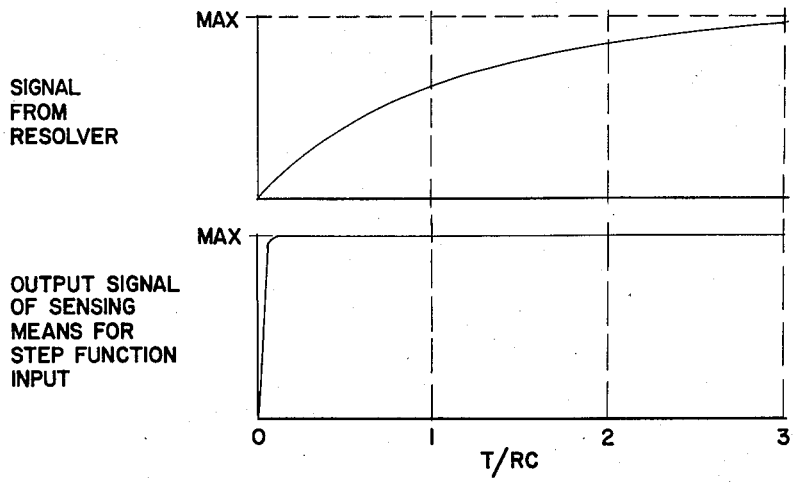
Figure 3 is a graph showing the comparison of the time lag produced between the output signals of the resolving mechanism and the output signals of the sensing means.
Figure 4:
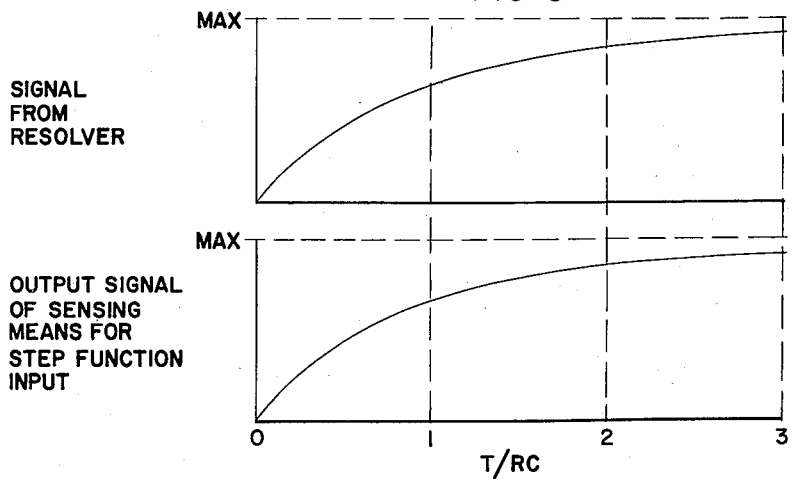
Figure 4 is a graph showing the comparison of the time lag produced between the output signals of the resolver and the output signals of the sensing means after being corrected.

Computer 10 is as shown in Figuure 1 receives a pair of signals $V_R$ and $H_R$ which are representative of the components of the displacement angle or angular velocity of a vector relative to earth coordinates of an object such as shown in Figure 5. The $V_R$ and $H_R$ signals are resolved about the roll axis of the aircraft in computer 10 to provide two signals E and the other an azimuth signal A which represent the vector components in another coordinate system. Filter means 11 receives the elevation component signal E from computer 10 through connecting means 13, filter the E signal through filter means 11, corrects for attenuation of the signal by amplifying it, and uses this signal E to energize resolver 15 through connecting means 16. Likewise, an azimuth signal is received on connecting means 14 from computer 10 which is used to energize filter means 12, correct for any attenuation caused by the filter 12, and causing this signal to also energize resolver 15 through connecting means 17. Assume first of all that the filter network of servo system 21 is missing from Figure 1, as sensing means 20 receives a roll angle signal, the displacement would be presented directly to resolving means 15 through connecting means 22 and 23. Since it is desirous to cancel the noise signals which accompany the signals received by computer 10, the time constant of filter networks 11 and 12 will be relatively large, probably being in the range of at least one second. Thus the signal that appears on connecting means 16 and 17 would be lagged behind the input signals received on correcting means 13 and 14 and would actually appear to resolving means 15 to arrive approximately one second later than when presented to filter means 11 and 12. If sensor 20 were to receive a signal such as a step input (Figure 3B) the signal from resolver 15 would appear as shown in Figure 3A. It may be seen that this signal (Figure 3A), which would correspond to one of the components of the vector relative to aircraft coordinates, increases exponentially and approaches a maximum signal after approximately three time constant periods have elapsed. However, the sensing means has reached its maximum displacement after a relatively short period of time and therefore leads the signal received from resolving means 15. In other words, the signals received from filter means 11 and 12 would always be lagged and be in error as they emerge from the resolver 15 since sensing means 20, under normal conditions would not remain absolutely stationary and thus the vector components received by resolver 15 would always be rotating with respect to sensing means 20, resulting in an error signal which is constantly changing. The present invention provides a means to cause the driving connection to resolving means 15 to be lagged an amount equal to the lag introduced by filter means 11 and 12 so that the input and output of resolving means 15 will be in apparent synchronization or in correct phase relationship. By adding the filter means to servo system 21 and choosing the elements of servo system 21 to produce a lag equal to filter means 11 and 12, the time constant produced by servo system 21 will equal that of filter means 11 and 12 and thereby cause the output signals from resolver 15 and the input driving signal to resolver 15 to be apparent synchronization as shown in Figure 4A and B respectively. As sensing means 20 receives a new signal representative of roll of the aircraft such as shown in Figure 3B, an output signal would appear as shown in Figure 4B since the step signal would be delayed and smoothed approaching the curve as shown in Figure 4B so that resolver 15 appears to detect the presence of the signals from filter means 11 and 12 at the same instant as the signal received from filter means 21 by connecting means 23. The signals thus presented to autopilot 24 by connecting means 25 and 26 are in apparent synchronization with sensing means 20, providing autopilot 24 with the proper vertical and horizontal signals to control the aircraft.

Assume now that the input signals $V_R$ and $H_R$ have been resolved in the computer into components of aircraft coordinates E and A, it may be seen that a signal such as the elevation signal E is used to energize variable resistor 32 and capacitor 33 through connecting lead 31, the pair of elements forming filter network 30. After the direct current signal has been filtered by filter means 30, the signal is used to energize amplifier 37 through summing resistor 30. Amplifier 37 compensates for any attenuation applied to the elevation signal and the output of amplifier 37 is introduced to chopper 52 by a connecting lead 59. As the direct current signal passes contact point 54, the chopper 52 which has armature 53 being oscillated at the frequency of voltage source 68, the signal is alternately allowed to pass and be grounded at ground 35. Thus an alternating voltage is produced which is representative of the magnitude of the elevation component of the vector with respect to the aircraft. This signal which is received by rotor winding 62 through connecting lead 60 produces an alternating voltage in rotor winding 62, the circuit being completed by connecting lead 65 and ground 35, back to amplifier 37 through connecting lead 41. In like fashion, the other half of the symmetrical circuit as just described operates in a similar manner, thereby producing an alternating voltage signal on rotor winding 61 and completing the circuit through connecting lead 65 and ground 35, back to amplifier 47 through connecting lead 51. If it is desired that the filter time constant be varied, such as may be the case where the noise signal may require less filtering at a greater range from the object, the time constant may be changed by a common shaft 121 which could be driven in accordance with the range of the aircraft to the given object, to vary the resistance of variable resistors 32 and 43.

As the aircraft rolls, gyroscope 20 senses the roll of the aircraft and this signal is imparted to the movable contact arm 70 of potentiometer 66 by connecting shaft 67. Potentiometer 66 which has a voltage source 73 and 78 which is center tapped to ground 35 develops a signal which is representative of the aircraft roll $\phi$ both in phase and magnitude, and the roll signal energizes variable resistor 75. The voltage signal dropped across variable resistor 75 is also applied to capacitor 76 which is grounded at the opposite end to provide a filter network 88 producing a signal which is delayed because of the time constant set up by filter 88. This delayed roll signal is then developed across summing resistor 80 and introduced to amplifier 81 by connecting lead 82. An output signal from amplifier 81 is used to energize a control field on motor 84 by connecting lead 86 and thereby cause motor-generator combination 85 to rotate and drive shaft 94, gear train 89 and shaft 94. Shaft 94 positions movable contact arm 95 of potentiometer 96 and also rotates rotor windings 61 and 62 of synchro resolver 15. A rebalance signal is developed across resistive element 97 of potentiometer 96 since resistive element 97 is in parallel with voltage source 98 and 100 which has the voltage source center tapped to ground 35. The signal provided by potentiometer 96 will be of equal magnitude to the roll signal received by amplifier 81, but of opposite sense or phase and thereby causes the signal which is presented to amplifier 81 from filter means 21 to be nulled or driven to a zero or null value through connecting lead 104 and summing resistor 105. To provide motor 84 with a negative feedback rate signal, rate generator 87 develops a negative rate feedback signal which is dropped across resistive element 106 of potentiometer 107 to ground 35. A portion of the negative rate feedback signal is detected by movable contact arm 112 and supplied to amplifier 81 through connecting lead 113 and summing resistor 114, resistor 114 being connected to amplifier 81 through connecting lead 82. The rate feedback circuit is further completed by having rate generator 87 connected to ground 35 through connecting lead 115 and completing the circuit to amplifier 81 through connecting lead 83. Variable resistor 75 may have its value changed by actuating connecting means 121 which is also attached to variable resistors 43 and 32 thereby causing the three filter networks to have the same time constant. Since the signals are received from the computer 10 have been delayed an amount equal to the time constant of filter networks 30 and 42 and the roll signal as seen by the resolving synchro 15 has been delayed by an amount equal to the time constant of filter network 88, and since the filter time constants are equal, the signals which appear on rotor windings 61 and 62 therefore appear to be in apparent synchronization when received by resolver synchro 15.

It is also possible to use the inherent dynamic lag in the servo system comprising amplifier 81 and motor-generator combination 85 to compensate in part for the time delay required so as to have the time constants of filter networks 30 and 42 matched by the time constant of filter network 88 and the time delay of the servo as just described. In fact it is entirely possible in some instances that the time delay of the servo system will be sufficient to match the time constant of filter networks 30 and 42 and filter network 88 may not be needed. By inductive coupling, the signals as received on rotor windings 61 and 62 are transformed to stator windings 63 and 64 and since the signals have been resolved about the roll angle of the aircraft, the signals which appear on stator windings 63 and 64 are components of the vector representative of the position or velocity of the object in question and are in a coordinate system relative to that of the earth. In other words, the signals which were received by resolver synchro 15 in aircraft coordinates have been transformed into earth coordinates and there is no error in the components as received by the stator windings of resolver synchro 15 since the sensing device 20 and the signals as received by the rotor windings 61 and 62 are in apparent synchronization. Therefore, autopilot 24 receives a signal which may be designated as a vertical signal V from stator winding 64 through connecting lead 118 and receives a signal which may be designated as a horizontal signal H from stator winding 63 to connecting lead 117. Stator windings 63 and 64 are connected to ground 35 through connecting lead 116 as well as autopilot 24.

While we have shown and described a preferred embodiment of this invention, the invention should not be limited to the particular form shown, and we intend in the appended claims to cover all modifications which do not depart from the spirit and scope of the invention.

What we claim is:

1. Computing apparatus for transforming a plurality of input signals representative of a vector related to a first reference system, into signals representative of components of said vector in a second reference system, said apparatus comprising: first means for receiving the plurality of input signals and for producing first output signals which lag said input signals by a predetermined amount; sensing means sensing a rotation of the vector relative to the first reference system and including means for producing a signal representative of said rotation; resolving means for producing output signals which have been transformed into coordinates relative to the second reference system; first connecting means connecting said sensing means to said resolving means to cause the rotational input of said resolving means to lag said sensing means by said predetermined amount; and second connecting means connecting said first means to said resolving means, said resolving means producing output signals which are in apparent synchronization with said signal produced by said sensing means.

2. Computing apparatus for transforming both a first signal representative of a first component of a vector where said component and said vector both lie in a plane perpendicular to a first axis of a body, and a second signal representative of a second component of said vector which is perpendicular to said first component, into signals representative of components of said vector in an earth stabilized reference system, said apparatus comprising: first means for receiving the first signal and for producing a first output signal which lags said first signal by a predetermined amount; second means for receiving the second signal and for producing a second output signal which lags said second signal by said predetermined amount; a stable reference; sensing means on said stable reference sensing rotation of the vector components about the first axis and including means for producing a third signal representative of said rotation; resolving means for producing output signals which are transformed into coordinates associated with said stable reference and are in apparent synchronization with said third signal; third means for receiving said third signal and producing a third output signal which lags said third signal by said predetermined amount; first connecting means connecting said third means between said signal producing means of said sensing means and said resolving means; and second connecting means connecting said first and second means to said resolving means.

3. Computing apparatus for transforming both a first signal representative of a first component of a vector where said component and said vector both lie in a plane perpendicular to the roll axis of a dirigible craft, and a second signal representative of a second component of said vector which is perpendicular to said first component, into signals representative of components of said vector in an earth stabilized reference system, said apparatus comprising: first filter means for receiving the first signal and for producing a first output signal which lags said first signal by a predetermined amount; second filter means for receiving the second signal and for producing a second output signal which lags said second signal by said predetermined amount; an earth stabilized reference; sensing means on said stable reference sensing rotation of the vector components about the roll axis and including means for producing a third signal representative of said rotation; resolving means for producing output signals which are transformed into coordinates associated with said earth stabilized reference and are in apparent synchronization with said third signal; third filter means having a lag equal to said lag produced by said first filter means; first connecting means connecting said third filter means between said signal producing means of said sensing means and said resolving means; and second connecting means connecting said first and second filter means to said resolving means.

4. Computing apparatus for transforming both a first signal representative of a first component of a distance vector where said component and said vector both lie in a plane perpendicular to the longitudinal axis of a dirigible craft, and a second signal representative of a second component of said distance vector which is perpendicular to said first component, into signals representative of components of said distance in an earth stabilized reference system, said apparatus comprising: first filter means for receiving the first signal and for producing a first output signal which lags said first signal by a predetermined amount; second filter means for receiving the second signal and for producing a second output signal which lags said second signal by a predetermined amount; a vertical gyroscope sensing rotation of the distance components about the longitudinal axis and including means for producing a third signal representative of said rotation; resolving means for producing output signals which are transformed into coordinates associated with said vertical gyroscope and are in apparent synchronization with said third signal; third filter means; first connecting means connecting said third filter means between said signal producing means of said vertical gyroscope and said resolving means; and second connecting means connecting said first and second filter means to said resolving means.

5. Computing apparatus for transforming an input signal representative of a vector in aircraft coordinates, into signals representative of components of said vector in an earth coordinate system, said apparatus comprising: first filter means for receiving the input signal and for producing a first output signal which lags said first signal by a predetermined amount; sensing means sensing rotation of the vector about an axis at an angle thereto and including means for producing a second signal representative of said rotation; resolving means for producing output signals which are transformed into coordinates of the earth coordinate system and are in apparent synchronization with said second signal; second filter means; first connecting means connecting said second filter means between said signal producing means of said sensing means and said resolving means; and second connecting means connecting said first filter means to said resolving means.

6. Computing apparatus for transforming both a first signal representative of a first component of a velocity where said component and said velocity both lie in a plane perpendicular to a first axis of a dirigible craft, and a second signal representative of a second component of said velocity which is perpendicular to to said first component, into signals representative of components of said velocity in an earth stabilized reference system, said apparatus comprising: first lag means for receiving the first signal and for producing a first output signal which lags said first signal by a predetermined amount; second lag means for receiving the second signal and for producing a second output signal which lags said second signal by said predetermined amount; gyroscopic reference means sensing rotation of said components about the first axis and including means for producing a third signal representative of said rotation; resolving means for producing output signals which are transformed into coordinates determined by said gyroscopic means and are in apparent synchronization with said third signal; third lag means; first connecting means connecting said third lag means between said signal producing means of said gyroscopic means and said resolving means; and second connecting means connecting said first and second lag means to said resolving means.

7. Computing apparatus for transforming both a first signal representative of a first component of a vector where said component and said vector both lie in a plane perpendicular to a first axis of a dirigible craft, and a second signal representative of a second component of said vector which is perpendicular to said first component, into signals representative of components of said vector associated with an earth stabilized plane, said apparatus comprising: first means for receiving the first signal and for producing a first output signal which lags said first signal by a predetermined amount; second means for receiving the second signal and for producing a second output signal which lags said second signal by said predetermined amount; means for establishing a stabilized plane; rotational sensing means on said stabilized plane sensing rotation of the vector component about the first axis including means for producing a third signal representative of said rotation; resolving means for producing output signals which are transformed into coordinates determined by said stabilized plane; third means including first connecting means connecting said signal producing means of said sensing means to said resolving means in such a manner that said resolving means lags said sensing means by said predetermined amount; and second conecting means connecting said first and second means to said resolving means.

8. Computing apparatus for transforming signals representative of components of a vector determined by a dirigible craft reference system into first and second signals representative of components of said vector in a second reference system, said apparatus comprising: first means for receiving said signals representative of components of a vector determined by a dirigible craft reference system and for producing output signals which lag said signals received thereby by a predetermined amount; sensing means sensing rotation of said vector components about an axis at an angle to said vector and having signal producing means for producing a third signal representative of said rotation; resolving means; first connection means connecting said signal producing means of said sensing means to said resolving means, said first connection means being characterized by having means which introduce a lag to the signal applied from said first connection means to said resolving means equal to the lag produced by said first means; and second connection means connecting said first means to said resolving means so that said output signals of said first means are applied to said resolving means.

References Cited in the file of this patent

UNITED STATES PATENTS

| | | |
|---|---|---|
| 2,715,274 | James | Aug. 16, 1955 |
| 2,723,800 | Marner | Nov. 15, 1955 |
| 2,776,428 | Hassler et al. | Jan. 1, 1957 |
| 2,788,476 | Shaw | Apr. 9, 1957 |
| 2,816,723 | Bleakney | Dec. 17, 1957 |